United States Patent
Spors et al.

(10) Patent No.: US 12,551,154 B2
(45) Date of Patent: Feb. 17, 2026

(54) SERIOUS AND CRITICAL EVENT ECG TRIAGE AND USER INTERFACE

(71) Applicant: Preventice Solutions, Inc., Rochester, MN (US)

(72) Inventors: Jeffrey R. Spors, Eyota, MN (US); Susan Herdina, Rochester, MN (US); Ryan Inches, Rochester, MN (US); Mike Butterbrodt, Stoughton, WI (US); Dave Gross, Rochester, MN (US); Drew Lohmeyer, Rochester, MN (US); Jan Hagenbrock, Rochester, MN (US)

(73) Assignee: Preventice Solutions, inc., Rochester, MN (US)

( * ) Notice: Subject to any disclaimer, the term of this patent is extended or adjusted under 35 U.S.C. 154(b) by 447 days.

(21) Appl. No.: 18/107,149

(22) Filed: Feb. 8, 2023

(65) Prior Publication Data
US 2023/0293081 A1  Sep. 21, 2023

Related U.S. Application Data

(60) Provisional application No. 63/307,795, filed on Feb. 8, 2022.

(51) Int. Cl.
*A61B 5/346* (2021.01)
*A61B 5/00* (2006.01)
*G16H 40/67* (2018.01)

(52) U.S. Cl.
CPC ............ *A61B 5/346* (2021.01); *A61B 5/7435* (2013.01); *G16H 40/67* (2018.01)

(58) Field of Classification Search
CPC ..... A61B 5/0006; A61B 5/0022; A61B 5/346; A61B 5/361; A61B 5/363; A61B 5/7267; A61B 5/7435; G06N 3/08; G16H 10/60; G16H 40/63; G16H 40/67; G16H 50/20; G16H 50/70
See application file for complete search history.

(56) References Cited

U.S. PATENT DOCUMENTS

2020/0077963 A1\*  3/2020  Mollazadeh ........... A61B 5/339

\* cited by examiner

*Primary Examiner* — George Manuel
(74) *Attorney, Agent, or Firm* — Faegre Drinker Biddle & Reath LLP

(57) ABSTRACT

A method includes detecting a first event within electrocardiogram (ECG) data, transmitting a first subset of the ECG data from a first computing system to a second computing system, displaying the first subset of the ECG data in a first window of a user interface (UI) of the second computing system, and selectively transmitting additional subsets of the ECG data from the first computing system to the second computing system as a user interacts with the UI.

20 Claims, 8 Drawing Sheets

SERIOUS AND CRITICAL EVENT ECG TRIAGE AND USER INTERFACE

CROSS-REFERENCE TO RELATED APPLICATIONS

This application claims priority to Provisional Application No. 63/307,795, filed Feb. 8, 2022, which is herein incorporated by reference in its entirety.

TECHNICAL FIELD

The present disclosure relates to devices, methods, and systems for monitoring, identifying, and classifying cardiac events.

BACKGROUND

Monitoring devices for collecting biometric data are becoming increasingly common in diagnosing and treating medical conditions in patients. For example, mobile devices can be used to monitor cardiac data in a patient. This cardiac monitoring can empower physicians with valuable information regarding the occurrence and regularity of a variety of heart conditions and irregularities in patients. Cardiac monitoring can be used, for example, to identify abnormal cardiac rhythms, so that critical alerts can be provided to patients, physicians, or other care providers and patients can be treated.

SUMMARY

In Example 1, a method includes detecting a first event within electrocardiogram (ECG) data and transmitting a first subset of the ECG data from a first computing system to a second computing system. The first subset of the ECG data includes a first time period of the ECG data surrounding the detected first event. The method further includes displaying the first subset of the ECG data in a first window of a user interface (UI) of the second computing system and selectively transmitting additional subsets of the ECG data from the first computing system to the second computing system as a user interacts with the UI. The additional subsets of the ECG data include a second time period of the ECG data preceding and/or following the first detected event.

Example 2 includes the method of Example 1 and further includes displaying the additional subsets of the ECG data in a second window of the UI.

Example 3 includes the method of Examples 1 or 2, wherein at least one of the additional subsets of the ECG comprises a second detected event.

Example 4 includes the method of any of Examples 1-3, wherein the selectively transmitting additional subsets of the ECG data is in response to detecting that the user is scrolling through the ECG displayed on the UI.

Example 5 includes the method of any of Examples 1-4, and further including determining that other detected events occurred before or after the first detected event and displaying icons on the UI for the other detected events, where the icons include metadata associated with the other detected events.

Example 6 includes the method of Example 5, wherein the icons are displayed adjacent to the first window.

Example 7 includes the method of Example 5, and further including displaying on the UI a snippet of ECG data surrounding one of the other detected events in response to the user selecting one of the icons associated with the one of the other detected events.

Example 8 includes the method of any of Examples 1-7, wherein the detecting the first event comprises using a trained neural network.

Example 9 includes the method of Example 8, and further including generating, by the trained neural network, metadata associated with the detected first event and displaying the generated metadata on the UI.

Example 10 includes the method of Example 9, wherein the metadata comprises a classification, a time, and a duration of the first detected event.

Example 11 includes the method of any of the preceding Examples, wherein the second time period is longer than the first time period.

Example 12 includes the method of any of the preceding Examples, wherein the first computing system is a server, wherein the second computing system is a personal computing system.

Example 13 includes a computer program product including instructions to cause one or more processors to carry out the steps of the method of Examples 1-12.

Example 14 includes a computer-readable medium having stored thereon the computer program product of Example 13.

Example 15 includes a server including the computer-readable medium of Example 14.

Example 16 includes a system with a server that includes a processor and one or more computer-readable media having computer-executable instructions embodied thereon. The instructions are configured to be executed by the processor to cause the processor to: detect a first event within ECG data, transmit a first subset of the ECG data to a remote computing system, cause the remote computing system to display the first subset of the ECG data in a first window of a UI of the second computing system, and selectively transmit additional subsets of the ECG data to the remote computing system as a user interacts with the UI. The first subset of the ECG data includes a first time period of the ECG data surrounding the detected first event, and the additional subsets of the ECG data include a second time period of the ECG data preceding and/or following the first detected event.

Example 17 includes the system of Example 16, wherein the instructions configured to be executed by the processor to cause the processor to cause the remote computing system to display the additional subsets of the ECG data in a second window of the UI.

Example 18 includes the system of Example 17, wherein the first window and the second window are synchronized such that, as the user interacts with one of the windows, the other window is updated.

Example 19 includes the system of Example 16, wherein the selectively transmit additional subsets of the ECG data is in response to detecting that the user is scrolling through the ECG displayed on the UI.

Example 20 includes the system of Example 16, wherein the instructions configured to be executed by the processor to cause the processor to determine that other detected events occurred before or after the first detected event and cause the remote computing system to display icons on the UI for the other detected events. The icons include metadata associated with the other detected events.

Example 21 includes the system of Example 16, wherein the instructions configured to be executed by the processor to cause the processor to cause the remote computing system to display on the UI a snippet of ECG data surrounding one of the other detected events in response to the user selecting one of the icons associated with the one of the other detected events.

Example 22 includes the system of Example 16, wherein the detect the first event comprises using a trained neural network.

Example 23 includes the system of Example 16, wherein the instructions configured to be executed by the processor to cause the processor to collect a set of detected events associated with a patient and selectively deliver individual detected events based on priority.

Example 24 includes the system of Example 23, wherein priority is based on a severity of the detected events.

Example 25 includes the system of Example 23, wherein the set of detected events are assigned to a single user.

Example 26 includes a method including detecting a first event within ECG data and transmitting a first subset of the ECG data from a first computing system to a second computing system. The first subset of the ECG data including a first time period of the ECG data surrounding the detected first event. The method further includes displaying the first subset of the ECG data in a first window of a UI of the second computing system and selectively transmitting additional subsets of the ECG data from the first computing system to the second computing system as a user interacts with the UI. The additional subsets of the ECG data including a second time period of the ECG data preceding and/or following the first detected event.

Example 27 includes the method of Example 26, and further including displaying the additional subsets of the ECG data in a second window of the UI.

Example 28 includes the method of Example 26, wherein the selectively transmitting additional subsets of the ECG data is in response to detecting that the user is scrolling through the ECG displayed on the UI.

Example 29 includes the method of Example 26, and further including determining that other detected events occurred before or after the first detected event and displaying icons on the UI for the other detected events, the icons including metadata associated with the other detected events.

Example 30 includes the method of Example 26, wherein the detecting the first event comprises using a trained neural network.

Example 31 includes the method of Example 30, and further including generating, by the trained neural network, metadata associated with the detected first event and displaying the generated metadata on the UI.

Example 32 includes the method of Example 31, wherein the metadata comprises a classification, a time, and a duration of the first detected event.

Example 33 includes a method including receiving a package of data relating to a cardiac event, where the data includes ECG data and associated metadata; classifying the cardiac event based on the ECG data; and routing the package of data to one of several software platforms based on the classifying of the cardiac event.

Example 34 includes the method of Example 33, and further including collecting a series of detected cardiac events routed to the one of several software platforms and assigning the series of detected cardiac events to a single user.

Example 35 includes the method of Example 34, and further including transmitting packages of data for each of the collected series of detected events to a remote computing system.

While multiple instances are disclosed, still other instances of the present disclosure will become apparent to those skilled in the art from the following detailed description, which shows and describes illustrative instances of the disclosure. Accordingly, the drawings and detailed description are to be regarded as illustrative in nature and not restrictive.

Figure 1:
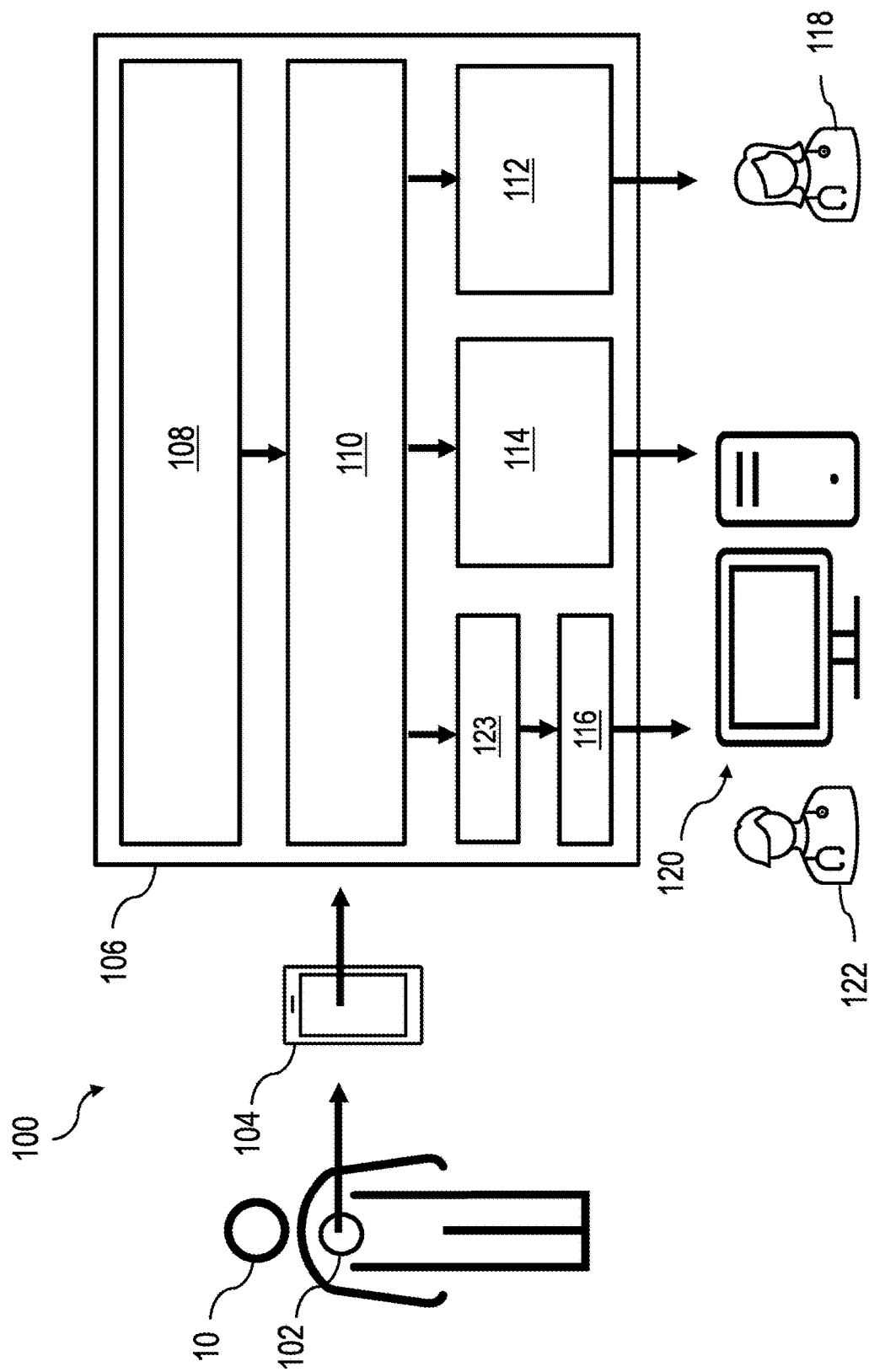
FIG. 1 shows a cardiac monitoring system, in accordance with certain instances of the present disclosure.

While the disclosed subject matter is amenable to various modifications and alternative forms, specific instances have been shown by way of example in the drawings and are described in detail below. The intention, however, is not to limit the disclosure to the particular instances described. On the contrary, the disclosure is intended to cover all modifications, equivalents, and alternatives falling within the scope of the disclosure as defined by the appended claims.

DETAILED DESCRIPTION

The present disclosure relates to devices, methods, and systems for monitoring, identifying, and classifying cardiac events (e.g., abnormal cardiac rhythms or other issues).

Electrocardiogram (ECG) data of a patient can be used to identify whether the patient has experienced a cardiac event. To collect ECG data, one or more monitoring devices (e.g., sensors, mobile phones) can be coupled to the patient such that the monitoring devices sense and record the ECG data. Because monitoring devices may be continuously sensing and recording ECG data, the amount of ECG data can be overwhelming to store, process, and analyze locally by the monitoring devices or mobile devices. As such, the recorded ECG data can be periodically transmitted to another device or system. These chunks of ECG data can be analyzed to identify cardiac events and then be further filtered down to shorter time periods of ECG data surrounding the identified cardiac event.

However, when analyzing a cardiac event, it can be beneficial to access and view more than just shorter time periods of ECG data. For example, an identified cardiac event may have been preceded by a related cardiac event that was transmitted and analyzed earlier. Therefore, the accuracy and efficiency of analysis of a given cardiac event can be increased by also analyzing ECG data preceding and/or following the cardiac event. However, providing access to larger sets of ECG data can be challenging with respect to computing resources and network bandwidth. Instances of the present disclosure are accordingly directed to systems, methods, and devices for providing access to ECG data.

FIG. 1 illustrates a patient 10 and an example system 100. The system 100 includes a monitor 102 attached to the patient 10 to detect cardiac activity of the patient 10. The monitor 102 may produce electric signals that represent the cardiac activity in the patient 10. For example, the monitor 102 may detect the patient's heart beating (e.g., using infrared sensors, electrodes) and convert the detected heartbeat into electric signals representing ECG data. The monitor 102 communicates the ECG data to a mobile device 104 (e.g., a mobile phone).

The mobile device 104 may include a program (e.g., mobile phone application) that receives, processes, and analyzes the ECG data. For example, the program may analyze the ECG data and detect or flag cardiac events (e.g., periods of irregular cardiac activity) contained within the ECG data. As noted above, because ECG data may be getting continuously generated, the amount of ECG data can be overwhelming to store and process locally on the mobile device 104. As such, the mobile device 104 can periodically transmit chunks of the ECG data to another device or system, which can process, append together, and archive the chunks of the ECG data. In certain instances, the mobile device 104 is programmed to transmit 10-minute chunks of ECG data along with metadata (e.g., time, duration, detected/flagged cardiac events) associated with the 10-minute chunk of ECG data. In certain instances, the monitor 102 may be programmed to transmit the ECG data directly to the other device or system without utilizing the mobile device 104. Also, in certain instances, the monitor 102 and/or the mobile device 104 includes a button or touch-screen icon that allows the patient 10 to initiate an event. Such an indication can be recorded and communicated to the other device or system.

Cardiac Event Server

In the example shown in FIG. 1, the mobile device 104 transmits the ECG data (and associated metadata, if any) to a cardiac event server 106 (hereinafter "the server 106" for brevity). The server 106 includes multiple platforms, layers, or modules that work together to process and analyze the ECG data such that cardiac events can be detected, filtered, prioritized, and ultimately reported to a patient's physician for analysis and treatment. In the example of FIG. 1, the server 106 includes one or more machine learning models 108 (e.g., deep neural networks), a cardiac event router 110, a notification platform 112, a stable event platform 114, and a serious and critical event platform 116. Although only one server 106 is shown in FIG. 1, the server 106 can include multiple separate physical servers, and the various platforms/modules/layers can be distributed among the multiple servers. Each of the platforms/modules/layers can represent separate programs, applications, and/or blocks of code where the output of one of the platforms/modules/layers is an input to another of the platforms/modules/layers. Each platform/module/layer can use application programming interfaces to communicate between or among the other platforms/modules/layers as well as systems and devices external to the server 106.

The server 106 applies the machine learning model 108 to the ECG data to classify cardiac activity of the patient 10. For example, the machine learning model 108 may compare the ECG data to labeled ECG data to determine which labeled ECG data the ECG data most closely resembles. The labeled ECG data may identify a particular cardiac event, including but not limited to ventricular tachycardia, bradycardia, atrial fibrillation, pause, normal sinus rhythm, or artifact/noise.

If the machine learning model 108 determines that the ECG data most closely resembles a labeled ECG data associated with a cardiac event, then the machine learning model 108 may determine that the patient 10 has experienced that cardiac event. Additionally, the machine learning model 108 may measure or determine certain characteristics of the cardiac activity of the patient 10 based on the ECG data. For example, the machine learning model 108 may determine a heart rate, a duration, or a beat count of the patient 10 during the cardiac event based on the ECG data. The machine learning model 108 may also determine a confidence level for each classification or identification of a cardiac event. The confidence level is an indication of certainty or uncertainty in the accuracy of the machine learning model's classification or identification. The server 106 stores the cardiac event (and associated metadata such as information like heart rate, duration, beat count, etc.) in a database for storage. Subsequently, the server 106 may retrieve the cardiac event and associated information from the database.

In certain instances, the mobile device 104 (or monitor 102) may initially classify a cardiac event based on the ECG data. The server 106 may then re-classify or confirm the cardiac event using the machine learning model 108. Doing so allows for a more computationally-expensive analysis of the ECG data to be performed using the computing resources of the server 106, rather than the limited resources of the mobile device 104.

The cardiac event router 110 accesses the ECG data along with the metadata generated by the machine learning model 108. The cardiac event router 110 determines whether the ECG data (and metadata) should be flagged for (or routed to) the notification platform 112, the stable event platform 114, or the serious and critical event platform 116. Identified cardiac events (and the corresponding ECG data and metadata) may be flagged or routed based on the classification associated with the cardiac event.

As one example, if the identified cardiac event is severe, the cardiac event router 110 can flag or send the ECG data, etc., to the notification platform 112. The notification platform 112 can be programmed to send notifications (along with relevant ECG data and associated metadata) immediately to the patient's physician/care group 118 and/or to the patient 10.

As another example, if the identified cardiac event is classified as a stable event, the cardiac event router 110 can flag or send the ECG data, etc., to the stable event platform 114. The stable event platform 114 can be accessed by a remote computer 120 (e.g., client device such as a laptop, mobile phone, desktop computer, and the like) by a user at a clinic or lab 122.

As another example, if the identified cardiac event is classified as a serious or critical event, the cardiac event router 110 can flag or send the ECG data, etc., to the serious and critical event platform 116. In certain instances, a triage layer 123—described in more detail further below—is positioned between the cardiac event router 110 and the critical event platform 116 so that detected events can be intercepted and analyzed before forwarding to the remote computer 120. The serious and critical event platform 116 can be accessed by the remote computer 120 by a user at the clinic or lab 122. The serious and critical event platform 116 is also described in more detail below.

In each of these examples, the cardiac event router 110 may first prioritize and sort the detected cardiac events before being routed to the notification platform 112, the stable event platform 114, or the serious and critical event platform 116. For example, the cardiac event router 110 may prioritize routing the most severe cardiac events (e.g., cardiac events with the highest heart rate, longest duration, and/or highest confidence level).

Serious and Critical Event Platform

Figure 2:
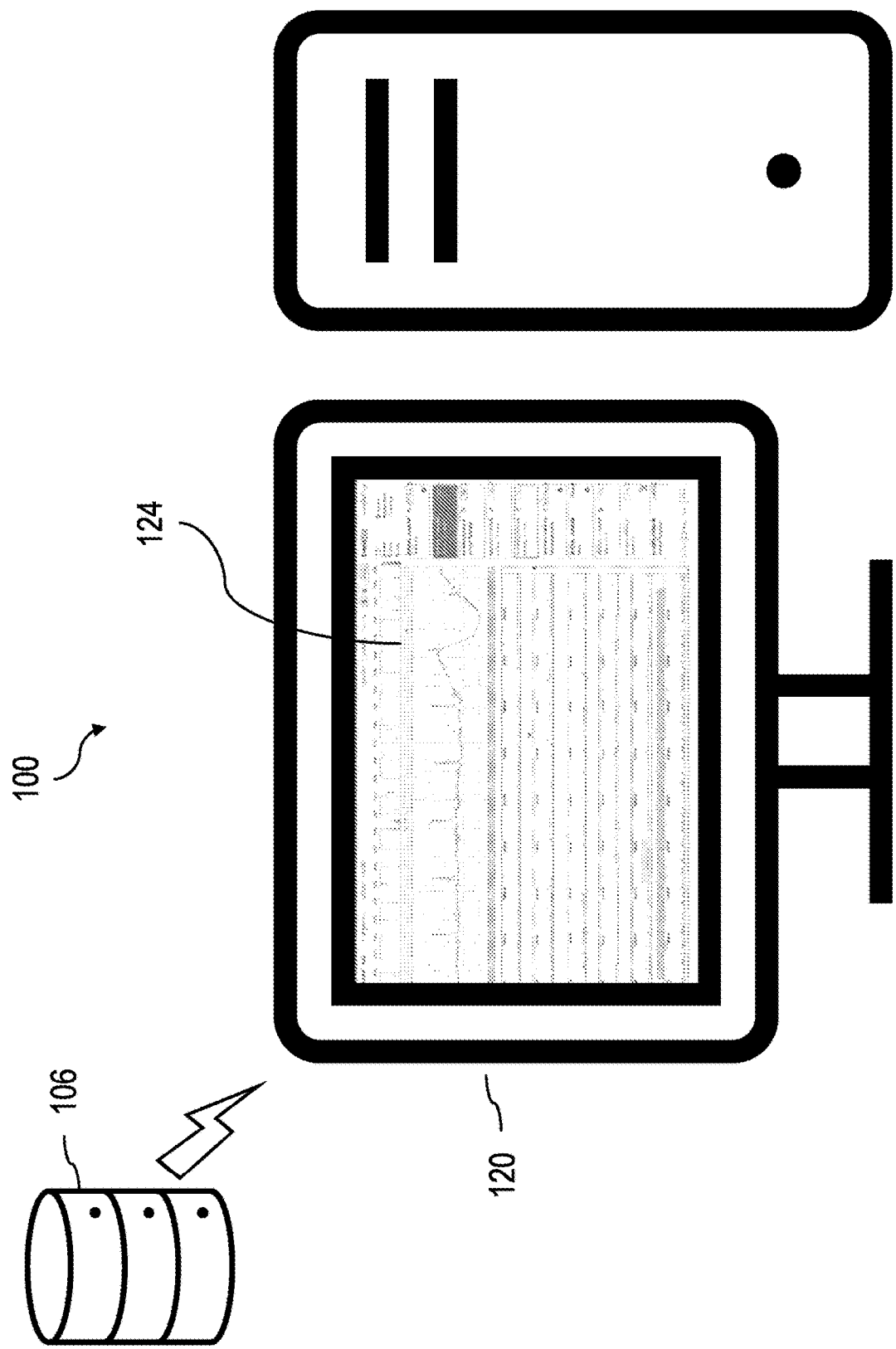
FIG. 2 shows a server, remote computer, and user interface, in accordance with certain instances of the present disclosure.

FIG. 2 shows the server 106 communicatively coupled (e.g., via a network) to the remote computer 120. In the example of FIG. 2, the remote computer 120 includes a monitor showing a user interface 124 (hereinafter "the UI 124" for brevity) that displays features of the serious and critical event platform 116 hosted by the server 106.

In the event the cardiac event router 110 of FIG. 1 flags or routes a detected cardiac event (and its ECG data and associated metadata) to the critical event platform 116, the package of data can include a snippet of the ECG data and associated metadata. Again, the metadata can include information about the patient 10, a heart rate of the patient 10 during the cardiac event, a duration of the cardiac event, a beat count of the cardiac event, and/or a confidence level of the machine learning model's identification of the cardiac event.

The package of data can include a 60-second strip of ECG data along with associated metadata for that strip of ECG data. This package of data includes the ECG data generated within a time period around the detected cardiac event. The package of data is a filtered and enhanced subset of the set of data (e.g., 10 minutes of ECG data) initially transferred from the mobile device 104 to the server 106. The critical event platform 116 can send the package of data to the remote computer 120, and the ECG data and associated metadata can be displayed in the UI 124.

As previously noted, when analyzing data associated with a given cardiac event, it can be beneficial to access and view more than just shorter time periods of ECG data. For example, an identified cardiac event may have been preceded by a related cardiac event that was transmitted and analyzed earlier. In such a case, the identified cardiac event may be redundant or an artifact of a prior detected event and can be ignored to save time and resources of the lab and physician. However, accessing, processing, and displaying a day's worth of ECG data—for each detected cardiac event-is not an efficient use of computing resources, network bandwidth resources, and human resources.

To help address these competing benefits and resource challenges, the critical event platform 116 can access and communicate ECG (and associated metadata) on an as-needed basis and/or selectively using various criteria described in more detail below.

First, the critical event platform 116 can access and communicate the package of data of the at-issue detected cardiac event to the remote computer 120. This package can include a 60-second strip of ECG data and associated metadata. In certain instances, this package of data (or an immediately subsequent package of data) includes a list of prior-detected and/or later-detected events (e.g., cardiac events detected within a 24-hour period of the at-issue detected event) and metadata associated with the listed events. However, in certain instances, to save computing and bandwidth resources, this package of data does not include the underlying snippets of ECG data for each of the listed events. The user can view aspects of the package of data via the UI 124.

Figure 3:
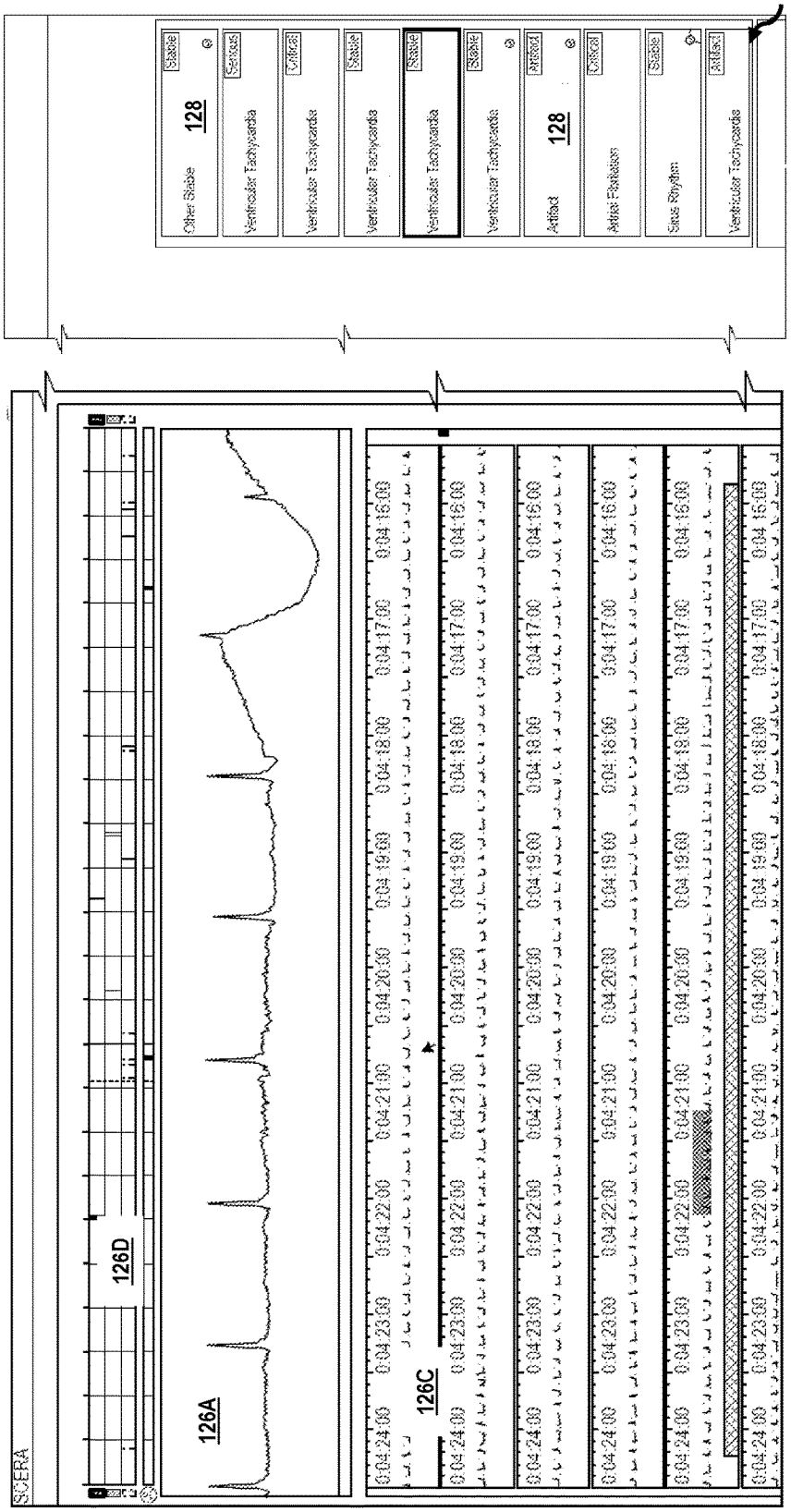
FIG. 3 shows the user interface of FIG. 2, in accordance with certain instances of the present disclosure.

FIG. 3 shows a closer-up view of the UI 124. The UI 124 includes multiple windows for displaying data, icons, links, and the like. In the example of FIG. 3, the ECG data from the package is displayed in a first window 126A. The user of the remote computer 120 can scroll (via a scrollbar) through the ECG data of the detected cardiac event which is displayed in the first window 126A.

Figure 4:
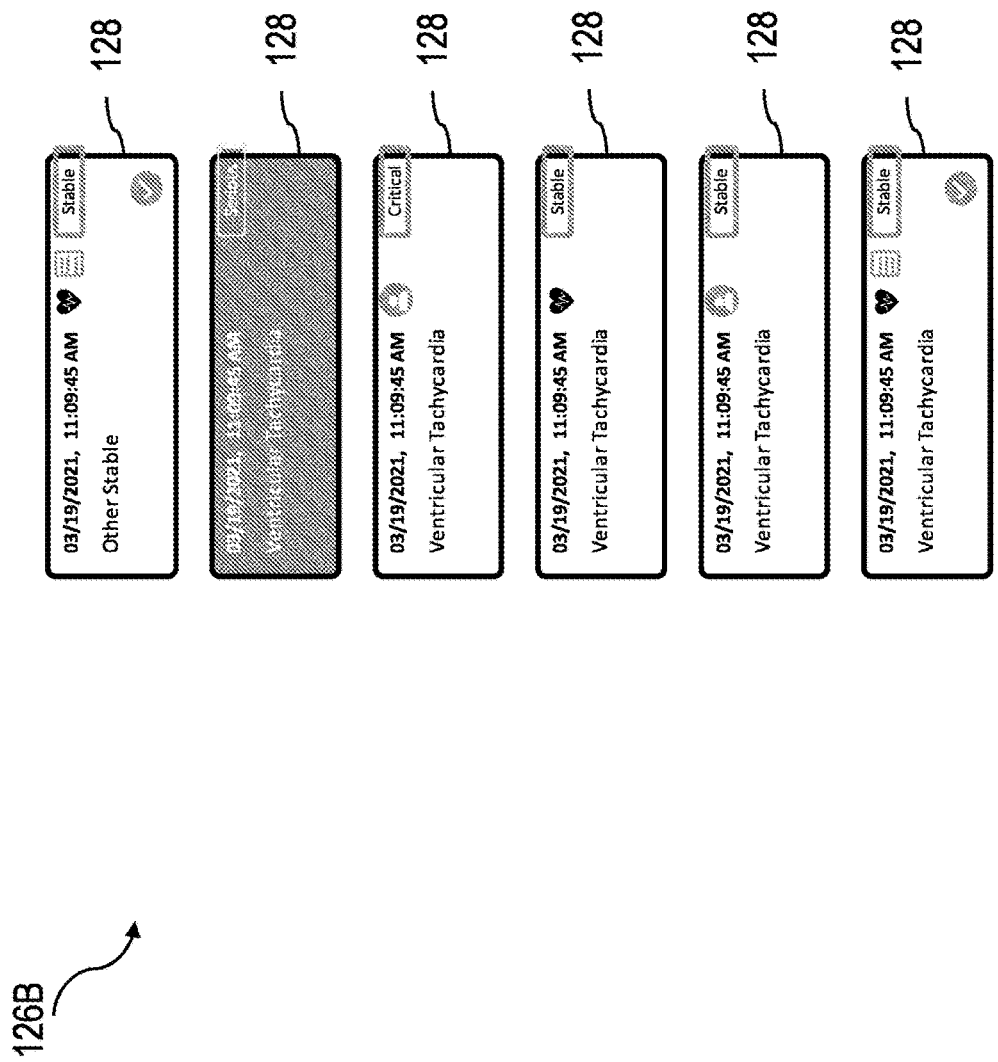
FIG. 4 shows a portion of the user interface of FIGS. 2 and 3, in accordance with certain instances of the present disclosure.

The list of events and associated metadata is displayed in a second window 126B of the UI 124. FIG. 4 shows a closer-up view of the second window 126B. Each prior event is represented by an icon 128. The icons 128 can display—for example—the day and time of the detected cardiac event, the initial or finalized classification of the cardiac event, where the cardiac event was routed, among other things.

In certain instances, the icons 128 can be selected by the user through the UI 124 so that the critical event platform 116 causes ECG data of the selected cardiac event to be displayed on the UI 124 (e.g., within the first window 124A). For this functionality to occur, the critical event platform 116 can first access and communicate packages of ECG data for each of the cardiac events listed on the UI 124. For example, the critical event platform 116 can access and send 60-second strips of ECG data and associated metadata for each of the listed cardiac events to the remote computer 120. This transfer can occur, for example, in the background while the user is reviewing the ECG data of the detected cardiac event that was initially transferred. As such, when the user selects one of the icons 128, the strip of ECG data for the selected cardiac event can be displayed in the first window 124A with little to no time lag between selection and display.

In addition to saving computing and network resources, the approach described above allows the user to review and process the detected events in a batch, as opposed to an event-by-event process. This batch approach can help reduce the number of redundant or unnecessary cardiac events that ultimately get sent to the patient 10 and/or their physician. For example, in viewing the multiple detected events in one batch of time, the user may determine that some detected events are artifacts or duplicative and therefore do not need to be separately flagged for the patient 10 and/or their physician. As another example, in viewing the multiple detected events in batches at a time, the user may determine that the detected events are related but the user can limit the number of events ultimately flagged for the patient 10 and/or their physician to the events that are most severe or representative of the batch of events.

In addition to viewing the batch of detected cardiac events, the user of the remote computer 120 may want to view more than just separate snippets of ECG data associated with detected events. However, as noted above, simply accessing, transferring, and displaying a large amount of ECG data (e.g., 24 hours, 12 hours) is an inefficient use of computing, network, and human resources—particularly if done for every detected cardiac event. To help address this resource challenge, the critical event platform 116 can selectively access, transfer, and display smaller chunks of ECG data and metadata as the user interacts with the UI 124.

For example, the critical event platform 116 can selectively access (e.g., from the database) and transmit additional subsets of the ECG data from the server 106 to the remote computer 120 as the user scrolls through ECG data in the first window 126A. Instead of accessing 24 hours of ECG data, for example, the critical event platform 116 can selectively access and communicate 10-minute strips of ECG data (or other time periods less than 24 hours).

To help assist the user with navigating the ECG data, the UI 124 can display a third window 126C with bars or strips representing a timeline of available ECG data that can be selected and viewed more closely in the first window 126A. Further, a fourth window 126D can display an event Gantt chart of the longer time period (e.g., a 24-hour time period) showing where in time the events listed in the second window 126B occurred. In certain instances, the windows 126A, 126B, 126C, and 126D are synchronized such that— as a user navigates/interacts with one of the windows—the other windows are updated to display relevant information from the selected time period.

As noted above, in certain instances, the triage layer 123 (shown in FIG. 1) is positioned between the cardiac event router 110 and the critical event platform 116. The triage layer 123 can function as a queue for packages or batches of detected cardiac events (and associated ECG data and metadata). The triage layer 123 can collect detected cardiac events from the cardiac event router 110 and selectively deliver the cardiac events to the critical event platform 116. For example, instead of permitting a user to select (at random) individual detected events for analysis, the triage layer 123 can collect detected events from one patient and assign the detected events to one user. As such, one user is more likely to be assigned a collection of related detected events instead of the events being assigned to separate users. In certain instances, the detected events are collected and then sent in a batch once a user is available. Also, in certain instances, a given detected event may be assigned based on a user's experience. For example, certain users may only be assigned serious events or critical events or both events depending on their experience level.

Regardless of how detected cardiac events are assigned or selected, by providing the user the ability to access multiple detected cardiac events and surrounding ECG data, the user can ultimately select one or more snippets of ECG data that best represent the cardiac event experienced by the patient. Further, the user can use the UI 124 to change the severity of the detected events, escalate, or de-escalate. For example, the user can change the detected events to a stable event, serious event, or critical event. Such a change in status can kick-off a process where the detected event is re-routed to another platform. The user can also re-route the detected event such that the physician and/or patient is notified. This helps improve efficiency and accuracy of reports that ultimately get transferred to the patient 10 and/or their physician.

Figure 5:
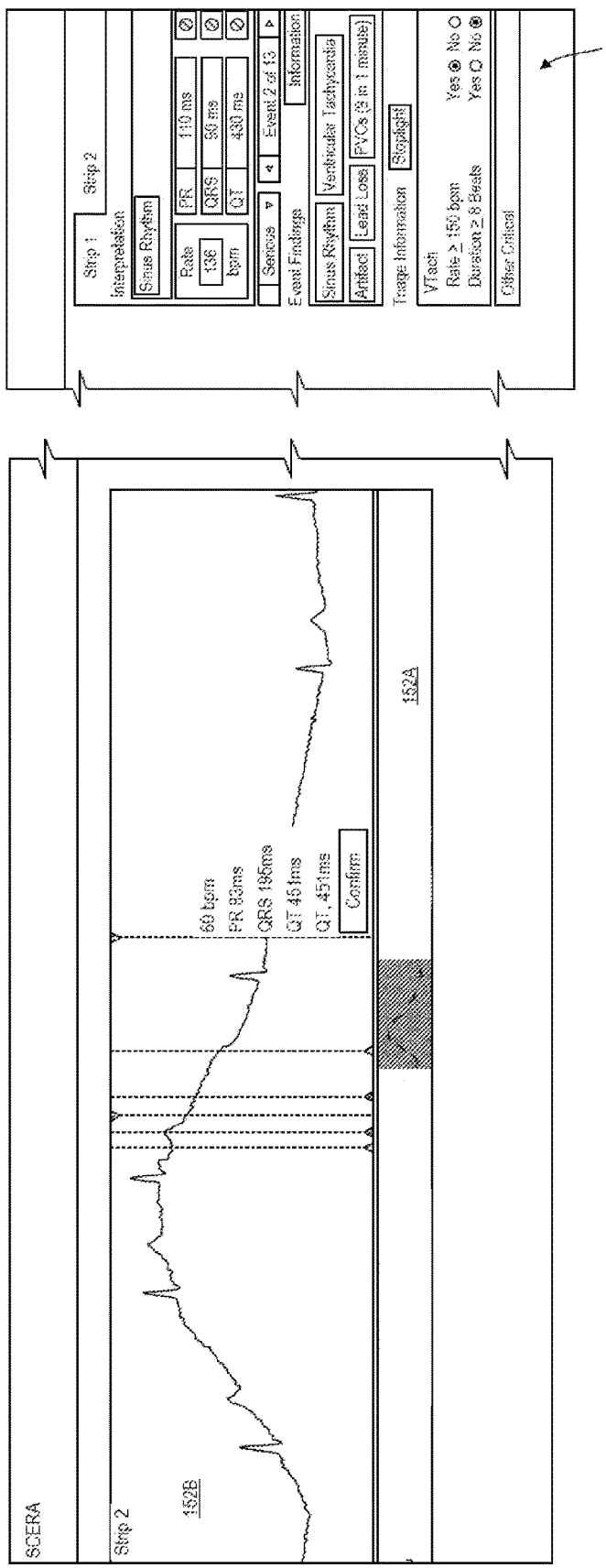
FIG. 5 shows another user interface, in accordance with certain instances of the present disclosure.

FIG. 5 shows another example user interface 150 (hereinafter "the UI 150" for brevity) generated by the critical event platform 116. Once the user has selected one or more representative cardiac events from the UI 124 of FIG. 3, the user can select a limited time period (e.g., 10 seconds, 6 seconds) of the ECG data to include in a report that gets transferred to the patient 10 and/or their physician. For example, a first window 152A of the UI 150 can display a snippet of the ECG data associated with the selected cardiac event, and the user can select a subset of this snippet of ECG data. The selected snippet of ECG data can be displayed in a second window 152B, and the user can modify by adding markers, etc., indicating information about the selected subset of ECG data. These markers can ultimately be included in a report that is transferred to the patient 10 and/or their physician. The UI 150 can also include a third window 152C where the user can enter information (e.g., notes or instructions) to be included in the report.

Methods

Figure 6:
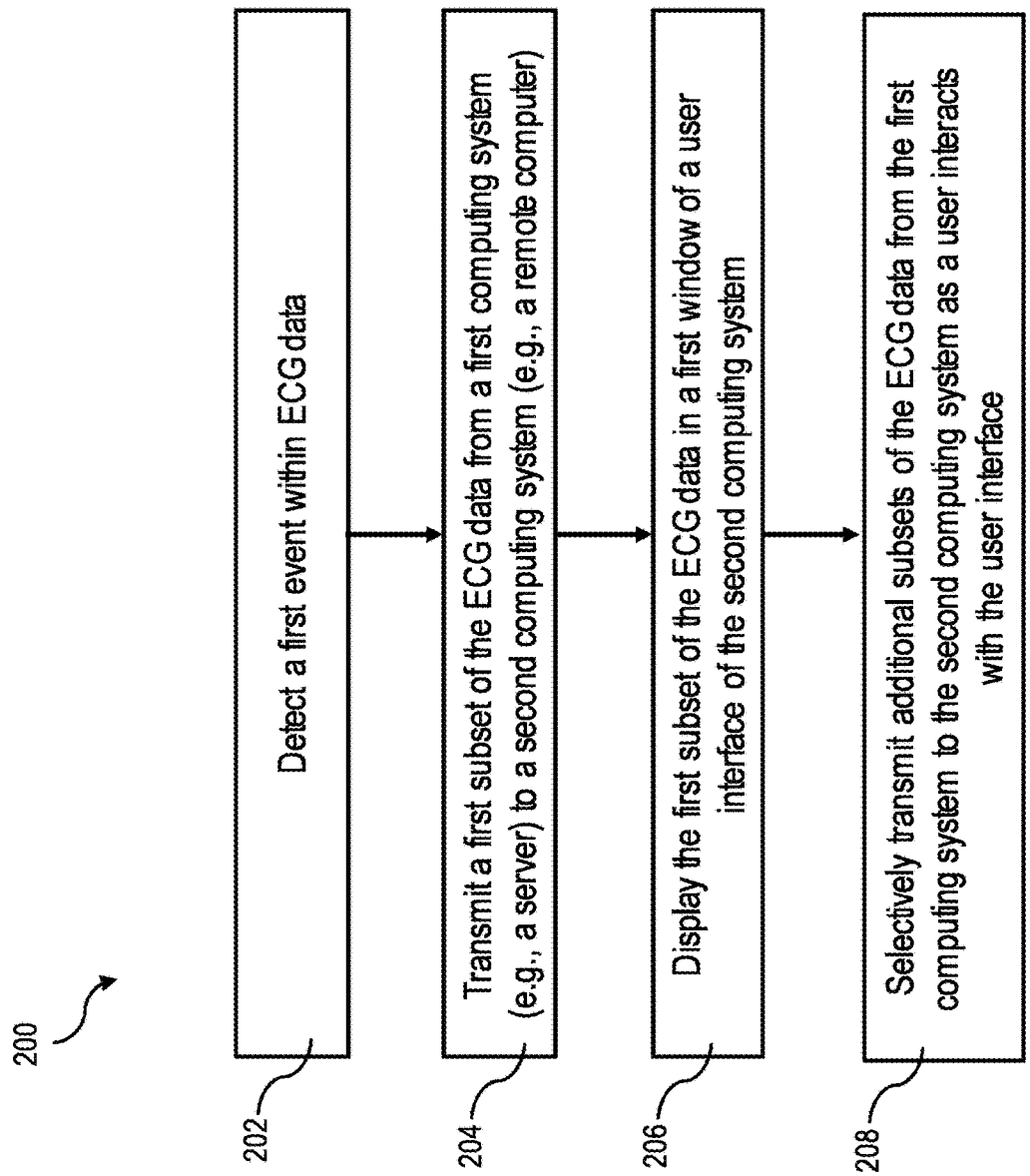
FIG. 6 shows a flow diagram depicting an illustrative method of selectively transferring and displaying subsets of ECG data, in accordance with instances of the disclosure.

FIG. 6 shows a block diagram of a method 200 for transferring and displaying ECG data. The method 200 includes detecting a first event within ECG data (block 202 in FIG. 6). The method 200 further includes transmitting a first subset of the ECG data from a first computing system (e.g., a mobile device) to a second computing system (e.g., a server) (block 204 in FIG. 6), where the first subset of the ECG data is associated with a first time period of the ECG data surrounding the detected first event. The method 200 further includes displaying the first subset of the ECG data in a first window of a user interface of the second computing system (block 206 in FIG. 6). The method 200 also includes selectively transmitting additional subsets of the ECG data from the first computing system to the second computing system as a user interacts with the user interface (block 208 in FIG. 6), where the additional subsets of the ECG data include a second time period of the ECG data preceding and/or following the first detected event.

Figure 7:
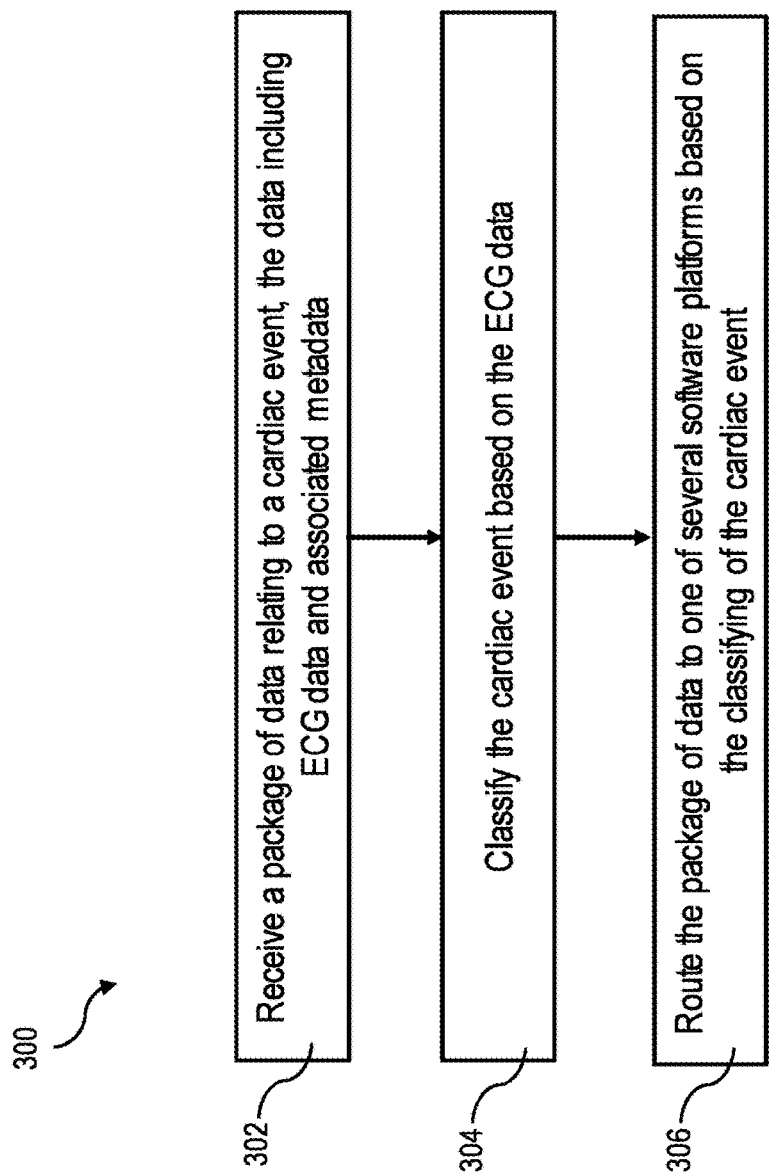
FIG. 7 shows a flow diagram depicting an illustrative method for routing cardiac event data, in accordance with instances of the disclosure.

FIG. 7 shows a block diagram of a method 300 for routing cardiac event data. The method 300 includes receiving a package of data relating to a cardiac event, the data including ECG data and associated metadata (block 302 in FIG. 7), classifying the cardiac event based on the ECG data (block 304 in FIG. 7), and routing the package of data to one of several software platforms based on the classifying of the cardiac event (block 306 in FIG. 7).

Computing Devices and Systems

Figure 8:
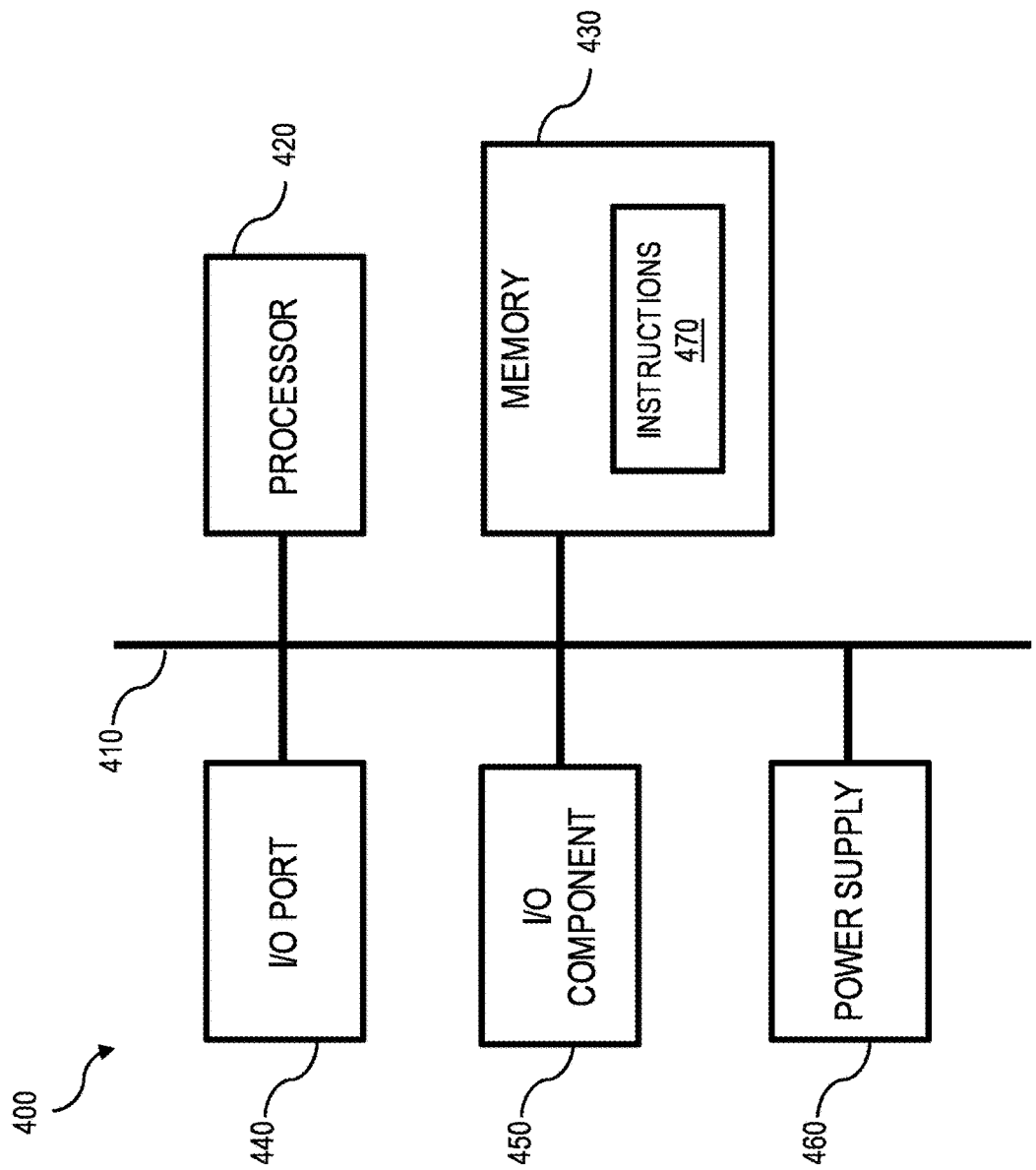
FIG. 8 is a block diagram depicting an illustrative computing device, in accordance with instances of the disclosure.

FIG. 8 is a block diagram depicting an illustrative computing device 400, in accordance with instances of the disclosure. The computing device 400 may include any type of computing device suitable for implementing aspects of instances of the disclosed subject matter. Examples of computing devices include specialized computing devices or general-purpose computing devices such as workstations, servers, laptops, desktops, tablet computers, hand-held devices, smartphones, general-purpose graphics processing units (GPGPUs), and the like. Each of the various components shown and described in the Figures can contain their own dedicated set of computing device components shown in FIG. 8 and described below. For example, the mobile device 104, the server, and the remote computer 120 can each include their own set of components shown in FIG. 8 and described below.

In instances, the computing device 400 includes a bus 410 that, directly and/or indirectly, couples one or more of the following devices: a processor 420, a memory 430, an input/output (I/O) port 440, an I/O component 450, and a power supply 460. Any number of additional components, different components, and/or combinations of components may also be included in the computing device 400.

The bus 410 represents what may be one or more busses (such as, for example, an address bus, data bus, or combination thereof). Similarly, in instances, the computing device 400 may include a number of processors 420, a number of memory components 430, a number of I/O ports 440, a number of I/O components 450, and/or a number of power supplies 460. Additionally, any number of these components, or combinations thereof, may be distributed and/or duplicated across a number of computing devices.

In instances, the memory 430 includes computer-readable media in the form of volatile and/or nonvolatile memory and may be removable, nonremovable, or a combination thereof. Media examples include random access memory (RAM); read only memory (ROM); electronically erasable programmable read only memory (EEPROM); flash memory; optical or holographic media; magnetic cassettes, magnetic tape, magnetic disk storage or other magnetic storage devices;

data transmissions; and/or any other medium that can be used to store information and can be accessed by a computing device. In instances, the memory 430 stores computer-executable instructions 470 for causing the processor 420 to implement aspects of instances of components discussed herein and/or to perform aspects of instances of methods and procedures discussed herein. The memory 430 can comprise a non-transitory computer readable medium storin the computer-executable instructions 470.

The computer-executable instructions 470 may include, for example, computer code, machine-useable instructions, and the like such as, for example, program components capable of being executed by one or more processors 420 (e.g., microprocessors) associated with the computing device 400. Program components may be programmed using any number of different programming environments, including various languages, development kits, frameworks, and/or the like. Some or all of the functionality contemplated herein may also, or alternatively, be implemented in hardware and/or firmware.

According to instances, for example, the instructions 470 may be configured to be executed by the processor 420 and, upon execution, to cause the processor 420 to perform certain processes. In certain instances, the processor 420, memory 430, and instructions 470 are part of a controller such as an application specific integrated circuit (ASIC), field-programmable gate array (FPGA), and/or the like. Such devices can be used to carry out the functions and steps described herein.

The I/O component 450 may include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The devices and systems described herein can be communicatively coupled via a network, which may include a local area network (LAN), a wide area network (WAN), a cellular data network, via the internet using an internet service provider, and the like.

Aspects of the present disclosure are described with reference to flowchart illustrations and/or block diagrams of methods, devices, systems and computer program products. It will be understood that each block of the flowchart illustrations and/or block diagrams, and combinations of blocks in the flowchart illustrations and/or block diagrams, can be implemented by computer program instructions.

Various modifications and additions can be made to the exemplary instances discussed without departing from the scope of the disclosed subject matter. For example, while the instances described above refer to particular features, the scope of this disclosure also includes instances having different combinations of features and instances that do not include all of the described features. Accordingly, the scope of the disclosed subject matter is intended to embrace all such alternatives, modifications, and variations as fall within the scope of the claims, together with all equivalents thereof.

We claim:

1. A system comprising:
a server comprising a processor and one or more computer-readable media having computer-executable instructions embodied thereon, the instructions configured to be executed by the processor to cause the processor to:
detect a set of events, including a first event, associated with a patient within electrocardiogram (ECG) data, selectively transmit individual detected events based on priority, including transmit a first subset of the ECG data to a remote computing system, the first subset of the ECG data comprising a first time period of the ECG data surrounding the detected first event,
cause the remote computing system to display the first subset of the ECG data in a first window of a user interface (UI) of the second computing system, and
selectively transmit additional subsets of the ECG data to the remote computing system as a user interacts with the UI, the additional subsets of the ECG data comprising a second time period of the ECG data preceding and/or following the first detected event.

2. The system of claim 1, wherein the instructions configured to be executed by the processor to cause the processor to:
cause the remote computing system to display the additional subsets of the ECG data in a second window of the UI.

3. The system of claim 2, wherein the first window and the second window are synchronized such that, as the user interacts with one of the windows, the other window is updated.

4. The system of claim 1, wherein the selectively transmit additional subsets of the ECG data is in response to detecting that the user is scrolling through the ECG displayed on the UI.

5. The system of claim 1, wherein the instructions configured to be executed by the processor to cause the processor to:
determine that other detected events occurred before or after the first detected event; and
cause the remote computing system to display icons on the UI for the other detected events, the icons including metadata associated with the other detected events.

6. The system of claim 1, wherein the instructions configured to be executed by the processor to cause the processor to:
cause the remote computing system to display on the UI a snippet of ECG data surrounding one of the other detected events in response to the user selecting one of the icons associated with the one of the other detected events.

7. The system of claim 1, wherein the detect the first event comprises using a trained neural network.

8. The system of claim 1, wherein priority is based on a severity of the detected events.

9. The system of claim 1, wherein the set of detected events are assigned to a single user.

10. A method comprising:
detecting a set of events, including a first event, associated with a patient within electrocardiogram (ECG) data;
selectively transmitting individual detected events based on priority, including transmitting a first subset of the ECG data from a first computing system to a second computing system, the first subset of the ECG data comprising a first time period of the ECG data surrounding the detected first event;
displaying the first subset of the ECG data in a first window of a user interface (UI) of the second computing system; and
selectively transmitting additional subsets of the ECG data from the first computing system to the second computing system as a user interacts with the UI, the additional subsets of the ECG data comprising a second time period of the ECG data preceding and/or following the first detected event.

11. The method of claim 10, further comprising:
displaying the additional subsets of the ECG data in a second window of the UI.

12. The method of claim 10, wherein the selectively transmitting additional subsets of the ECG data is in response to detecting that the user is scrolling through the ECG displayed on the UI.

13. The method of claim 10, further comprising:
determining that other detected events occurred before or after the first detected event; and
displaying icons on the UI for the other detected events, the icons including metadata associated with the other detected events.

14. The method of claim 10, wherein the detecting the first event comprises using a trained neural network.

15. The method of claim 14, further comprising:
generating, by the trained neural network, metadata associated with the detected first event; and
displaying the generated metadata on the UI.

16. The method of claim 15, wherein the metadata comprises a classification, a time, and a duration of the first detected event.

17. The method of claim 10, wherein the set of detected events are assigned to a single user.

18. A method comprising:
receiving a package of data relating to a cardiac event, the data including electrocardiogram (ECG) data and associated metadata;
classifying the cardiac event based on the ECG data;
routing the package of data to one of several software platforms based on the classifying of the cardiac event;
detecting a set of events, including a first event, associated with a patient within electrocardiogram (ECG) data;
selectively transmitting individual detected events based on priority, including transmitting a first subset of the ECG data from a first computing system to a second computing system, the first subset of the ECG data comprising a first time period of the ECG data surrounding the detected first event;
displaying the first subset of the ECG data in a first window of a user interface (UI) of the second computing system; and
selectively transmitting additional subsets of the ECG data from the first computing system to the second computing system as a user interacts with the UI, the additional subsets of the ECG data comprising a second time period of the ECG data preceding and/or following the first detected event.

19. The method of claim 18, further comprising:
collecting a series of detected cardiac events routed to the one of several software platforms and assigning the series of detected cardiac events to a single user.

20. The method of claim 18, wherein the set of detected events are assigned to a single user.

* * * * *